UNITED STATES PATENT OFFICE.

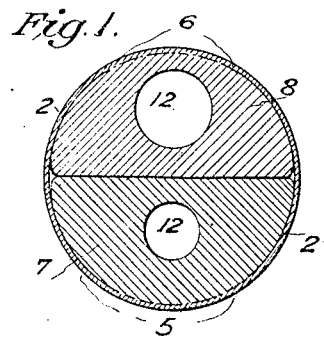
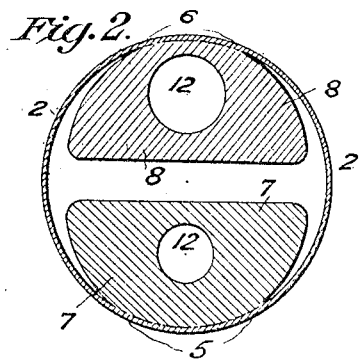
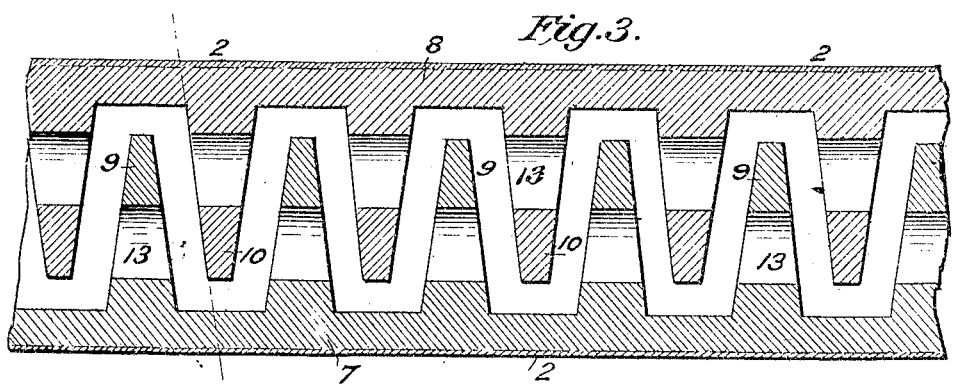
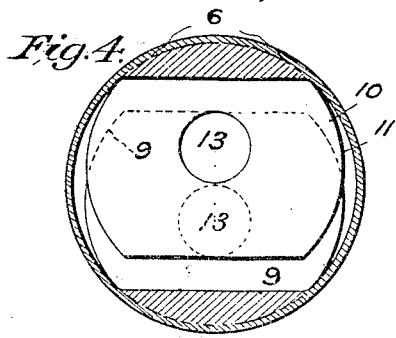
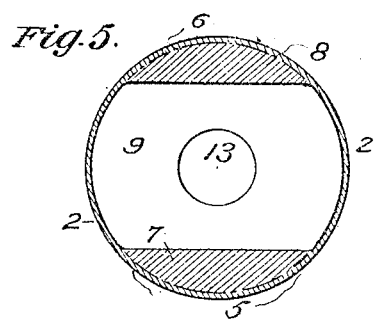

HARRY MUSCLOW AND WILLIAM A. ROBERTS, OF VANCOUVER, BRITISH COLUMBIA, CANADA.

PNEUMATIC TIRE.

No. 888,345.　　　　Specification of Letters Patent.　　　　Patented May 19, 1908.

Application filed July 23, 1907. Serial No. 385,109.

*To all whom it may concern:*

Be it known that we, HARRY MUSCLOW and WILLIAM A. ROBERTS, citizens of the Dominion of Canada, residing at Vancouver, in the Province of British Columbia, Canada, have invented a new and useful Improvement in Pneumatic Tires, of which the following is a specification.

This invention relates to an improved inner tube for a pneumatic tire such as is used on automobiles or the like.

In vehicles of this class, where any considerable weight is to be sustained, if the inner tube of a tire should be punctured or for any reason collapse, the tube is apt to be ruined in making the run home or to where the injury can be attended to.

Attempts have previously been made to guard against this injury by furnishing the inner tube with reinforcing core members of various forms that will oppose the elastic resistance of their material to compression at the tread and prevent collapse of the tube; but such devices have not been satisfactory, as the reinforcing core has been so applied or attached within the air containing tube that the elastic resistance of the material of the core has been called into play in the normal use of the tire, and has thus impeded to a greater or less extent the quick elastic action of the compressed air on which the success of a pneumatic tire depends. Under these circumstances the tire instead of being properly a pneumatic one has partaken in its normal use more of the character of a solid rubber or cushion tire.

Our effort has therefore been to provide a collapse resisting core that will not, when properly inflated with air, interfere with the proper action of the pneumatic feature of the tire, but that will, if the inner air containing tube should be punctured or for other reason lose its air, sustain the inner tube of the tire against complete collapse and will furnish the material resistance of a cushion tire to carry the vehicle to a place where the repair can be effected.

The invention is fully described in the following specification reference being made to the drawings by which it is accompanied, in which:

Figure 1 is a vertical cross section of our tire in its simplest form when not inflated, Fig. 2, a similar view when inflated, Fig. 3, a longitudinal vertical section showing the preferred form of our tire inflated, and Figs. 4 and 5, cross sections of the same when inflated and when the air is withdrawn respectively.

In these drawings 2 represents the inner or air containing tube of a tire which may be placed within an outer tube or shield of any approved kind, the outer protective covering being immaterial to this application the subject matter of which comprises merely what is known as the inner or air containing tube.

Round the inside of the tread portion 5 of the tube 2 and round the inside at 6, diametrically opposite in the tube cross section, are cemented rings 7 and 8 of rubber or other similar material. The dimensions and the conformation of these rings are such that when together they correspond approximately to the cross section of the tube 2 when not inflated and except where cemented at 5 and 6, the rings 7 and 8 are free from direct connection with one another or with the tube 2, so that they will not interefere with the free dilation and normal compression of the tube at the tread, when the tube is pumped up with air.

The cemented tread segment 5 is preferably extended through a considerable arc of the cross section so that the tube 2 will be reinforced at that part to prevent a puncture which might penetrate the outer covering of the tire.

The core rings 7 and 8 may be provided with an annular core space 12 of any suitable form to impart a greater measure of elasticity.

In the preferred modification illustrated in Figs. 3, 4 and 5 the rings 7 and 8 are of less minimum thickness and their adjacent faces are provided with interprojecting denticulations 9 and 10 which at the sides 11 conform approximately to the diameter of the tube before inflation. These interprojecting teeth are preferably well tapered from base to tip and the interspaces may be equal to or greater than the thickness of the teeth according to the weight to be imposed upon the tire but the following essential features must be insured; viz, that when the tube 2 is inflated and the rings 7 and 8 drawn apart the teeth of the two rings must be clear of contact with one another, and that when the air is withdrawn from the tube, as in a condition of puncture, the tips of the teeth must contact with the opposing ring to afford material support against collapse, and in the heavier tires the tapered sides of the teeth may also contact and so afford a more solid support.

The teeth are perforated with apertures 13 to permit the free passage of air from end to end of the tire during inflation or when in use.

While the tube 2 is inflated it is distended free of contact with the core members or their teeth except at the segments 5 and 6 where it is cemented to them and the denticulations owing to the taper of their sides from tip to base will normally be free from one another, so that the tire is to all intents and purposes depending simply on the air cushion within it for its resilience; but when from any cause the compressed air which inflated the tube is withdrawn the tube 2 will merely shrink upon the cushion core rings or the sides 11 of the teeth and its general cylindrical conformation will be maintained by them and the weight instead of causing the complete flattening of the tube at the point of tread will be sustained by the solid material resistance of the core members and serious injury to the tire will be avoided.

Having now particularly described our invention and the manner of its operation, we hereby declare that what we claim as new and desire to be protected in by Letters Patent, is:

1. As an inner tube for a pneumatic tire, the combination with an inflatable tube ring of flexible elastic air tight material, of a denticulated ring cemented round the tread of the tube on the inside and a corresponding denticulated ring on the diametrically opposite side of the tube the denticulations of the two rings interprojecting and the conformation of the inner cemented rings and the sides of the denticulations approximating to the inner conformation of the tube before inflation.

2. As an inner tube for a pneumatic tire, the combination with an inflatable tube ring of flexible elastic air tight material, of means for preventing the collapse of the tube upon itself when not inflated such means comprising core rings of rubber or other suitable material cemented to the inside of the tube round the tread and diametrically opposite, said rings each provided with interprojecting teeth the adjacent sides of which are tapered from base to tip the conformation of the core rings and their denticulations conforming when together approximately to that of the tube when not inflated.

3. As an inner tube for a pneumatic tire, the combination with an inflatable tube of elastic material, a core ring secured around the inside of the tread portion of the tube, a similar ring secured diametrically opposite on the inner side of the tube, the core rings conforming approximately to the inside of the tube when not inflated and the sides of said core rings being free from attachment to the tube so that the tube is free to inflate laterally from the rings.

4. As an inner tube for a pneumatic tire, the combination with an inflatable tube of flexible elastic material, a core ring cemented round the inside of the tread portion of the tube, a similar ring similarly secured diametrically opposite on the inner side of the tube, the core rings conforming approximately to the inside of the tube when not inflated and the sides of said core rings being free from attachment to the tube so that the tube is free to inflate laterally from the rings.

In testimony whereof we have signed our names to this specification in the presence of two subscribing witnesses.

HARRY MUSCLOW.
WILLIAM A. ROBERTS.

Witnesses:
ROWLAND BRITTAIN,
CLIVE S. CARMAN.